United States Patent [19]

Irani et al.

[11] 3,965,001

[45] June 22, 1976

[54] PROCESS FOR REMOVING DISPERSED MATTER FROM WATER

[75] Inventors: Cyrus A. Irani, Clark; Daniel J. McHugh, Edison, both of N.J.

[73] Assignee: Exxon Research and Engineering Company, Linden, N.J.

[22] Filed: Feb. 12, 1973

[21] Appl. No.: 331,864

[52] U.S. Cl. .................................. 210/28; 210/40; 210/47; 210/DIG. 27
[51] Int. Cl.² ........................................ C02C 9/02
[58] Field of Search .......................... 210/42–47, 210/49, 51, 28, 40, DIG. 21; 252/322, 323, 326, 329, 330

[56] References Cited

UNITED STATES PATENTS

| | | | |
|---|---|---|---|
| 2,047,989 | 7/1936 | Woelflin | 210/44 |
| 2,702,794 | 2/1955 | Kellogg | 252/329 |
| 2,934,419 | 4/1960 | Cook | 210/42 |
| 3,446,732 | 5/1969 | Gasser et al. | 210/44 |
| 3,552,917 | 1/1971 | Weiss | 210/53 |
| 3,615,811 | 10/1971 | Barrett | 423/430 |

*Primary Examiner*—Charles N. Hart
*Assistant Examiner*—Benoit Castel
*Attorney, Agent, or Firm*—Robert J. Baran; Joseph J. Allocca

[57] ABSTRACT

The instant invention relates to a process for removing dispersed matter from water which comprises, providing a flocculated salt selected from the group consisting of iron, aluminum and Group IIA of the Periodic Table of the Elements in said water, adsorbing at least a portion of said dispersed matter on said flocculated salt, providing an oil, adsorbing said flocculated salt on said oil, and separating said dispersed matter from said water along with said flocculated salt and said oil. This process especially relates to the separation of dispersed matter, e.g., oil, from sea water, wherein said Group IIA flocculated salt is provided by adjusting the pH of said sea water with a basic material to precipitate magnesium hydroxide. Alternatively, a basic carbonate salt may be added to sea water to precipitate calcium carbonate from sea water as the flocculated salt. The pH is adjusted to at least 7 but preferably not over 10.5 so as to eliminate further treatment of the water, to meet environmental quality standards, prior to discharge. The pH of sea water is preferably adjusted by addition of lime.

3 Claims, No Drawings

PROCESS FOR REMOVING DISPERSED MATTER FROM WATER

FIELD OF THE INVENTION

The instant invention relates to a process for removing dispersed matter from water which comprises, providing a flocculated salt selected from the group consisting of iron, aluminum and Group IIA of the Periodic Table of the Elements in said water, adsorbing at least a portion of said dispersed matter on said flocculated salt, providing an oil, adsorbing said flocculated salt on said oil, and separating said dispersed matter from said water along with said flocculated salt and said oil. This process especially relates to the separation of dispersed matter, e.g., oil, from sea water, wherein said Group IIA flocculated salt is provided by adjusting the pH of said sea water with a basic material to precipitate magnesium hydroxide. Alternatively, a basic carbonate salt may be added to sea water to precipitate calcium carbonate from sea water as the flocculated salt. The pH is adjusted to at least 7 but preferably not over 10.5 so as to eliminate further treatment of the water, to meet environmental quality standards, prior to discharge. The pH of sea water is preferably adjusted by addition of lime.

BACKGROUND OF THE PRIOR ART

Separating the dispersed phase in a very fine liquid-liquid emulsion or dispersion can be a difficult task. The problem is greatly aggravated if the dispersion is further stabilized due to the presence of electrical charges or by strong interfacial films. This situation is very commonly encountered in the ballast water discharged by tankers carrying crude oil. The problem arises when tankers having discharged their cargo of crude oil, take on ballast, for reasons of stability. Before a new cargo can be taken on, the ballast water contaminated by oil must be discharged.

The oil is dispersed in the ballast water when it is passed through the pumps used for loading or discharging, and the dispersion is stabilized by the presence of strong interfacial films formed by components in the crude. Any chemical aids that would help in flocculating these very fine emulsion systems would play a considerable role in a more complete separation of the oil phase using more conventional techniques.

Ocean waters and the water of harbors connected to the open sea, have a high salinity. These waters also contain a large amount of minerogenic and biogenic suspended material called setson, some of which could play the role of surfactants or flocculants. In addition, harbor waters are quite polluted and could have a large amount of suspended solids due to silt and the discharge from sewers.

U.S. Pat. No. 650,216 teaches a process for the removal of oil from water which comprises the addition of lime to form a soap. It is apparent that this process relates to the removal of vegetable oils and not to the petroleum oils commonly encountered in ballast water treating. This process further teaches that one may, after the addition of lime to precipitate said soap, add a non-crystallizing substance such as a sulfide or hydroxide to help in the filtering of the precipitated soap.

U.S. Pat. No. 3,128,248 teaches a process wherein lime is added to a brine solution to precipitate magnesium hydroxide and calcium carbonate. The precipitate may then be coagulated with oil, soap or polyelectrolyte. There is no teaching, however, that this process may be applied to the separation of oil from water and further this process teaches the equivalency of oil, soap and polyelectrolytes for coagulation of the precipitated materials. The coagulant actually used in the example is a polyelectrolyte. Thus, there is no teaching of the unique advantage of using an oil to efficiently remove a pecipitated phase.

U.S. Pat. No. 3,347,786 teaches a process for the purification of water, wherein said water may be contaminated by a mineral oil, and which comprises the addition of a metallic hydroxide as a flocculating agent to remove suspended matter, redissolving said metal hydroxide, filtering to remove said suspended matter, reprecipitating said metal hydroxide by adjusting the pH, redissolving, etc. This process utilizes repeated precipitating and dissolving steps to remove said suspended matter and does not recognize the advantage of adding an oil to said flocculated salt to remove it.

U.S. Pat. No. 3,301,779 teaches a process for treating cold rolling mill effluent containing oil emulsified in water, which comprises the addition of an alkaline waste, containing sodium hydroxide soap and emulsified oil; and waste pickle liquor, containing sulfuric acid and ferrous sulfate; to said cold rolling mill effluent to form a precipitate, pressurizing said precipitated solution with air, and releasing the pressure, whereby air bubbles are formed which float said precipitated oil to the top where it is recovered for reuse in cold rolling. The teaching of this reference specifically prohibits the use of calcium contaning materials in this process, since it is well known that calcium salts can ruin the properties of oils utilized in cold rolling mill operations.

Finally, Japanese Patent 7224822 teaches a process for separating oil from water which comprises mixing a low specific gravity mineral oil and ferric hydroxide with the oil containing water to form a cotton-like ferric hydroxide, allowing the mixture to stand so that the ferric hydroxide ascends together with contaminated oil droplets and said low specific gravity oil adsorbed on said ferric hydroxide to form an upper layer, separating said upper layer from said aqueous lower layer, adding a paste-like purifying agent comprising ferric hydroxide, mineral oil and a stabilizer such as magnesium oxide to the aqueous layer, allowing the mixture to stand so that the remaining contaminated oil and purifying agent ascend to form an upper layer and subsequently separating upper layer from purified water.

SUMMARY OF THE INVENTION

It has now unexpectedly been discovered that dispersed matter may be removed from water by providing a flocculated salt selected from the group consisting of aluminum, iron, and Group IIA of the Periodic Table of the Elements in said water, adsorbing at least a portion of said dispersed matter on said flocculated salt, providing an oil, adsorbing said flocculated salt on said oil, and separating said dispersed matter from said water along with said flocculated salt and said oil. This process is especially useful for the removal of dispersed matter from sea water, wherein the prior art flocculating processes are ineffective. Furthermore, this invention is especially useful for the removal of petroleum oils from sea water, i.e., oil-contaminated ballast water may be substantially purified by the use of this process. In general, oil-contaminated sea water may be substantially purified by the process of this invention and returned to the sea without hazarding the environment.

The instant process makes use of a flocculated salt selected from the group consisting of iron, aluminum and Group IIA of the Periodic Table of the Elements of absorb at least the portion of the dispersed matter present in the water. The Group IIA flocculated salt may be magnesium hydroxide, strontium carbonate, calcium carbonate, magnesium carbonate, etc. The iron and aluminum salts are the hydroxides thereof. The preferred flocculated salts are the Group IIA hydroxides and carbonates, especially magnesium hydroxide, strontium carbonate, and calcium carbonate.

The flocculated salt may be provided by adding a soluble salt from the above-defined group to the water from which the dispersed matter is to be separated, and precipitating the salt by adjusting the pH. Alternatively, the flocculated salt may be mixed with the water as a preformed aqueous slurry or, although not generally preferred, in a substantially water-free state.

Suitable soluble salts include ferric sulfate, ferric chloride, alum, magnesium chloride, calcium chloride, strontium hydroxide, etc. The concentration of said soluble salt must be sufficient to yield a suitable amount of precipitate upon adjustment of pH. Large excesses are, in general, not harmful, but should be avoided for economic reasons. In general, the concentration of soluble salt may vary from 0.001 to 0.5 moles, depending on the solubility of the particular salt used.

The process of the instant invention is especially preferred for removing dispersed matter from sea water, wherein the flocculated salt may be conveniently supplied by adjusting of pH of the sea water with a basic material to precipitate magnesium hydroxide. Basic materials which can be utilized to adjust the pH of sea water include quicklime, slaked lime or any other form of the oxide or hydroxide of calcium. Mixtures of the oxides of calcium and magnesium, for example calcinated dolomite or slaked calcinated dolomite, alkali hydroxide or ammonium hydroxides may also be used. Because of economy and ready availability, the oxides or hydroxides of calcium are preferred basic materials for adjusting the pH of sea water. Furthermore, the calcium salts themselves will not generally detract from the quality of the water which is returned to the sea after treatment by the process of the invention.

Alternatively, a soluble hydroxide, i.e., strontium hydroxide, may be added to sea water to precipitate an active form of strontium carbonate which is another effective flocculated salt. Strontium carbonate and magnesium hydroxide are the preferred Group IIA flocculated salt for use in the instant process. Additionally a soluble carbonate, i.e., sodium or potassium carbonate, may be added to sea water to precipitate calcium carbonate which is also effective as a flocculant.

Magnesium, because it is present in sea water, will, of course, precipitate out in a form suitable for flocculating dispersed matter upon adjustment of pH. Strontium carbonate requires the addition of strontium hydroxide as stated above. Calcium carbonate is not quite as effective as magnesium hydroxide or strontium carbonate for use as a flocculated salt in the instant process. However, it may be desirable for use in removing oil or other dispersed matter from sea water since it is conveniently available by the addition of a soluble carbonate to the sea water. The most preferred flocculated salt for separation of oil from sea water is magnesium hydroxide.

When treating sea water by providing a flocculated magnesium hydroxide, the pH is preferably adjusted to at least 7, more preferably the pH is adjusted to from about 7 to about 10.5. Higher pH's than 10.5 are not always suitable because of environmental requirements on the pH of water which is to be returned to the sea. Thus, a higher pH than 10.5 may be used, but a subsequent pH lowering step might be required before the water is returned to the sea.

The instant process is especially applicable to separation of petroleum oils from sea water. Said petroleum oils may be present in sea water from various sources; for example, ballast water from ship cleaning and ballasting operations, refinery waste water streams, especially those refineries located along coast lines which use sea water for cooling and processing needs. In general, any water used by refineries or crude ships which also contains magnesium hardness can be treated by this invention. Petroleum oils found in sea water which are from these sources may be very finely dispersed by the action of pumps and other equipment used to move the water around. The crude oils may also have natural surfactants present (porphyrins) which form protective stable films around the individual finely dispersed droplets. The resulting dispersions are very fine and very stable and consequently not breakable by simple means, e.g. gravity, settling, filtration, etc. will not completely flocculate the dispersed oil. The instant invention has considerable significance in the treatment of oil dispersions of these types.

In the instant invention the flocculated salt is provided in the water from which the dispersed matter is to be removed and said water is agitated to adsorb at least a portion of said dispersed matter on said flocculated salt. Preferably the shear rates used in this step of the invention are low to moderate to allow for a complete contacting of the flocculant with the dispersed matter. Once the dispersed matter has been substantially adsorbed on the flocculant, additional oil is added and further mixing provided. The mixing at this step has to be at low shear rates so as to ensure that none of the additional oil is redispersed into the water phase. The available range of shear rates is quite sufficient to allow for efficient contacting of the additional oil with the flocculated salt and to permit facile separation of the additional oil and the flocculated salt when the mixing is stopped.

The instant process is substantially independent of temperature, and ambient may be conveniently used. Alternatively, the temperature may be adjusted to more completely precipitate the flocculated salt. The flocculated salt is stirred with said water phase for from about 1 to about 30 minutes, preferably from 5 to 10 minutes, to substantially adsorb said dispersed matter. An oil is then provided and agitation continued to adsorb said flocculated salt, at least a portion of which contains adsorbed dispersed matter, on said oil. This oil is preferably hydrocarbon oil having specific gravity less than water so that when agitation is discontinued the oil, along with said flocculated salt and said dispersed matter, will rise to the surface where it can be collected. In the preferred process for treating sea water to remove oil, this requirement is not critical, since the dispersed matter is generally lighter than water, i.e., is a hydrocarbon oil. Conveniently, in ballast water treating, the oil which is utilized to adsorb said flocculated salt after it has been contacted with the oil containing ballast water, is a heavy base oil.

It is preferred in the instant process to add the additional oil after contacting the dispersed oil with the flocculated salt, so as to avoid finely dispersing said additional oil during the adsorption of the dispersed oil on the flocculated salt. Alternatively, the flocculated salt and the additional oil may be contacted with the dispersed oil simultaneously.

Another process which is within the scope of the instant invention is a variation of the process disclosed in copending application Ser. No. 119,005, now U.S. Pat. No. 3,740,329. In this variation the liquid membrane coated droplets disclosed therein are substituted for the additional oil.

In a preferred embodiment of the instant invention sea water, especially ballast water, containing from 100 to 1000 ppm of a hydrocarbon oil is contacted with a flocculated salt, e.g. $Mg(OH)_2$, which is provided in said sea water by adjusting the pH to at least 7.0 with a basic material, e.g. lime. The sea water is agitated at low to moderate shear, e.g. 5 to 500 RPM, by use of pumps, paddle mixers, etc. for from 1 to 10 minutes to adsorb said oil on said flocculated salt. In ballast water treatment, the process may be conveniently carried out on board ship, e.g., in the various holding tanks available. The flocculated salt, at least a portion of which contains adsorbed oil, is contacted with additional oil for from about 1 to about 60 minutes at low shear rates, e.g., 5 to 100 RPM. At this point the dispersed hydrocarbon oil, flocculated salt, and additional oil have formed large clumps. Agitation is discontinued and said clumps are separated from the sea water. Separation may be carried out conveniently by skimming the surface of said water, wherein the flocculated salt and oil will reside, by techniques known in the art. For example, said oil and said flocculated salt may be skimmed off. The preferred flocculated salts are preferably hydroxides and carbonates which can be subsequently dissolved by lowering the pH. Thus, after separating the purified water which may now contain from about 1 to 10 ppm of hydrocarbon oil, the flocculated salt can be dissolved in an aqueous acid and cycled for reuse, leaving behind the oil and any dispersed matter that is insoluble at the pH at which the flocculated salt is dissolved. The oil originally present in the sea water and the additional oil are separated together. Thus, the instant process provides for the reclamation of the oil which was previously dispersed in the sea water. In a preferred embodiment of this invention the separated oil is used for adsorbing the flocculated salt in further treatment of oil containing sea water. Thus, the instant process may be operated continuously without significant material loss.

The following are specific embodiments of the instant invention:

Example 1

For the purpose of these experiments, the oil dispersions were obtained by mixing the oil and water at high shear rates in a blender. This would most closely duplicate the action of a centrifugal pump on a similar mixture, as would be the case on board a tanker taking on ballast water. From the data in Table I, it can be seen that the properties of harbor water (salinity and suspended materials) are instrumental in causing some coalescing of dispersed oil. This ability is enhanced if the ballast water is subject to some mixing after passing through the pump, thus allowing more complete flocculation of the dispersed oil to take place. With harbor water originally containing 1000 ppm dispersed oil, filtering through Ottawa sand gives an effluent of 128 ppm, whereas with mixing prior to filtering the effluent contains only 28 ppm. After repeated operation, the filter utilized in this experiment requires backwashing for optimum efficiency. However, the filtered oil adheres tenaciously to the filter media, thus requiring extensive backwashing procedures, e.g., increased backwashing times, etc.

TABLE I

| Treatment | Oil in Effluent PPM Natural Harbor Water |
|---|---|
| Direct filtration through Ottawa sand | 128 |
| Mixing to allow coalescing, followed by filtration through Ottawa sand | 28 |

Example 2

Two flocculated salts, i.e., (1) strontium carbonate and (2) magnesium hydroxide, were used to remove oil from sea water. Both these salts were found to be very effective flocculants in the treatment of dispersed oil, as shown in Table II. The starting oil concentrations were at 250 ppm and again a mixing step followed by a filtration step was used in obtaining the data for Table II.

TABLE II

| Type of Flocculant | Concentration of Flocculant PPM | Oil Concentration In Effluent Water, PPM |
|---|---|---|
| Strontium Carbonate | 100 | 7 |
| Strontium Carbonate | 100 | 11 |
| Magnesium Hydroxide | 50 | 4 |
| Magnesium Hydroxide | 50 | 2 |

The flocculated salts may be prepared by precipitation from sea water by the techniques disclosed above, i.e., pH adjustment at least 7.0 to precipitate $Mg(OH)_2$ and addition of strontium hydroxide to sea water to precipitate strontium carbonate.

As the magnesium cation is present in sea water, and as this flocculant is especially effective for use in flocculating oil present in sea water, the most economical and simple method for treating dispersed oil is to obtain the required flocculants from sea water itself by raising the pH to at least 7.

For magnesium hydroxide this can be very easily accomplished by the addition of quicklime, slaked lime, or any other form of the oxide or hydroxide of calcium. Mixtures of the oxides of calcium and magnesium, e.g. calcinated dolomite or slaked calcinated dolomite can also be used. In addition, any other soluble hydroxide like the alkali hydroxide or ammonium hydroxide can also be used.

Strontium carbonate is provided in sea water by the addition of strontium hydroxide. Generally from 0.01 to 10 parts strontium hydroxide will be added per hundred parts of sea water.

Alternatively, a soluble carbonate, e.g. sodium or potassium carbonate, may be added to sea water to precipitate a calcium carbonate flocculant. For example, from about 0.1 to about 10 parts per hundred sodium carbonate may be added to sea water to precipitate a flocculated calcium carbonate.

That the flocculated salt obtained by the addition of a chemical like lime to natural sea water is indeed a magnesium salt, can be verified by the following experiment. To a 500 g batch of natural sea water 0.05 g of calcium oxide is added with considerable stirring. The very fine colloidal precipitate (flocculated salt) obtained is then collected by filtration. When the precipitate is analyzed by qualitative spectroscopy, the major component of the precipitate is found to be magnesium.

Example 3

In Table III are shown some results obtained when calcium oxide is added to an artificial ballast mixture. Again, mixing adequate for coalescence is first provided, followed by filtration through Ottawa sand. The artificial ballast mixture consists of 250 ppm oil.

The filter, upon continued use, requires backwashing thus, the process described herein is not completely satisfactory.

TABLE III

| Type of Crude Oil | Concentration of Crude in Ballast PPM | Calcium Oxide Added to Ballast PPM | Concentration of Oil in Effluent PPM |
|---|---|---|---|
| Larossa | 250 | 100 | 3 |
| Larossa | 250 | 100 | 4 |
| Sag River | 1000 | 400 | 5 |
| Sag River | 1000 | 400 | 6 |

Example 4

In this experiment, additional oil was added after contacting the flocculated salt with the oil dispersed in sea water. The additional oil, the flocculated salt, and the dispersed oil were removed, after mixing at 50 RPM for about 1 minute, as large clumps floating on the surface of the sea water. The sea water was then analyzed for oil.

TABLE IV

| Additional Oil Phase | PPM Dispersed Oil in Sea Water | PPM CaO Added | PPM Oil in Seawater After the Above-Described Treatment |
|---|---|---|---|
| *Solvent-100 Neutral | 250 | 100 | 3 |
| *Solvent-100 Neutral | 250 | 100 | 6 |
| *Solvent-100 Neutral | 250 | 100 | 6 |
| Bunker Oil | 250 | 100 | 6 |
| Bunker Oil | 250 | 100 | 4 |

*An isoparaffinic solvent available from Exxon Chemical Co.

These results should be compared with those obtained in Examples 1 through 3. It is evident that dispersed oil may be efficiently removed from sea water, without filtration and the problems inherent therein, by the process of the instant invention. Moreover it is evident that the results obtained as measured by oil content of the treated water are at least equivalent.

Example 5

It is sometimes desirable to precipitate a flocculated magnesium hydroxide by adjusting the pH of a small portion of sea water with lime, and then adding said small portion to the sea water which is to be treated to remove the dispersed oil. In this manner, the pH of the small portion may be adjusted to 10 or more to effectively precipitate magnesium hydroxide, yet the pH of the treated sea water will be lower because of dilution. This technique is especially effective for treating sea water containing high concentrations of dispersed oil. In this technique, a small sidestream of sea water, which may or may not be the sea water which is to be treated, is treated with lime to raise the pH to 10 or more. Upon dilution, e.g. by passing said sidestream and said dispersed oil containing sea water through the pumps utilized in ballast water handling, the pH may be brought down to less than 8.5.

In particular, a ballast water containing dispersed oil was mixed with a sea water sidestream which had been pH adjusted with lime, to provide flocculated magnesium hydroxide. The dispersed oil concentration was 250 ppm and the flocculated magnesium was 100 ppm based on the total mixture. After approximately one minute of low agitation the mixture was filtered through a sand filter. The filtrate contained 2 ppm oil. When a heavy oil was utilized to adsorb the flocculated salt, rather than filtering, the total oil remaining was 7 ppm. Thus, it is seen that this technique is not quite as effective as providing the flocculated salt in situ. However, the pH of the treated ballast water was less than 8.5, and thus required no further neutralization before return to the sea.

What is claimed is:

1. A process for removing dispersed oil from sea water which comprises:
   a. dissolving strontium hydroxide in sea water to precipitate a flocculated strontium carbonate salt,
   b. adsorbing said oil on said flocculated salt,
   c. providing additional oil in said sea water,
   d. adsorbing said oil-adsorbed flocculated salt on said additional oil, and
   e. separating said additional oil along with said oil-adsorbed flocculated salt.

2. A process for removing dispersed oil from sea water which comprises:
   a. adjusting the pH of a small portion of sea water to at least 10, whereby a flocculated salt selected from Group IIA of the Periodic Table of the Elements precipitates;
   b. adding said small portion of sea water to the sea water from which the dispersed oil is to be removed and thereby diluting the mixture of sea water to a pH of less than 8.5;
   c. adsorbing said oil on said flocculated salt,
   d. providing additional oil in said sea water,
   e. adsorbing said oil-adsorbed flocculated salt on said additional oil, and
   f. separating said additional oil along with said oil adsorbed flocculated salt.

3. The process of claim 2 wherein said pH is adjusted by the addition of an oxide or hydroxide of calcium to precipitate magnesium hydroxide.

* * * * *